(12) United States Patent
Akizuki et al.

(10) Patent No.: US 7,278,010 B2
(45) Date of Patent: Oct. 2, 2007

(54) INSTRUCTION EXECUTION APPARATUS COMPRISING A COMMIT STACK ENTRY UNIT

(75) Inventors: Yasunobu Akizuki, Kawasaki (JP); Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 10/331,917

(22) Filed: Dec. 31, 2002

(65) Prior Publication Data

US 2004/0006684 A1 Jan. 8, 2004

(30) Foreign Application Priority Data

Jul. 5, 2002 (JP) ............... 2002-197860

(51) Int. Cl.
 *G06F 9/30* (2006.01)
 *G06F 9/40* (2006.01)
 *G06F 15/00* (2006.01)
(52) U.S. Cl. .............. 712/217; 712/215; 712/216; 712/217; 712/218
(58) Field of Classification Search ............... 712/218, 712/217, 215, 216
See application file for complete search history.

(56) References Cited

U.S. PATENT DOCUMENTS

| | | | | |
|---|---|---|---|---|
| 5,548,738 | A | * | 8/1996 | Song .................. 712/215 |
| 5,557,763 | A | | 9/1996 | Senter et al. |
| 5,659,782 | A | | 8/1997 | Senter et al. |
| 5,903,740 | A | * | 5/1999 | Walker et al. .......... 712/217 |
| 5,987,593 | A | | 11/1999 | Senter et al. |
| 6,230,254 | B1 | | 5/2001 | Senter et al. |
| 6,502,186 | B2 | | 12/2002 | Inoue |

FOREIGN PATENT DOCUMENTS

| | | |
|---|---|---|
| JP | 2001-181708 | 6/2000 |
| JP | 2001-75803 | 3/2001 |

OTHER PUBLICATIONS

Dean M. Tullsen, Susan J. Eggers, Joel S. Emert, Henry M. Levy, Jack L. Lo, and Rebecca L. Stammt Exploiting Choice: Instruction Fetch and Issue on an Implementable Simultaneous Multithreading Processor 1996.*
Intel Corporation A Tour of the P6 Microarchitecture 1995.*
David Patterson and John Henessy, "Computer Organization & Design, The Hardware/Software Interface", 1998.*
James Smith and Andrew Pleszkun; Implementing Precise Interrupts in Pipelined Processors; May 1988.*

* cited by examiner

*Primary Examiner*—Donald Sparks
*Assistant Examiner*—Jesse R. Moll
(74) *Attorney, Agent, or Firm*—Staas & Halsey LLP

(57) ABSTRACT

An instruction execution apparatus comprising a register storing a copy of contents of a maximum number of entries that are executable simultaneously in one cycle with the entry storing the oldest unreleased instruction at a head among all entries in an instruction storage device after execution of the instructions, a completion condition determination section 44 for determining whether the instructions stored in the entries of the register are completed in the cycle for determining completion conditions of the entries in the instruction storage device, and an entry release section 44 for releasing only the entries that are determined to be completed by the completion condition determination section among all entries in the instruction storage device, which allows the entries in the CSE to be released smoothly even though the number of entries in a commitment stack entry, or clock frequency, is increased.

10 Claims, 13 Drawing Sheets

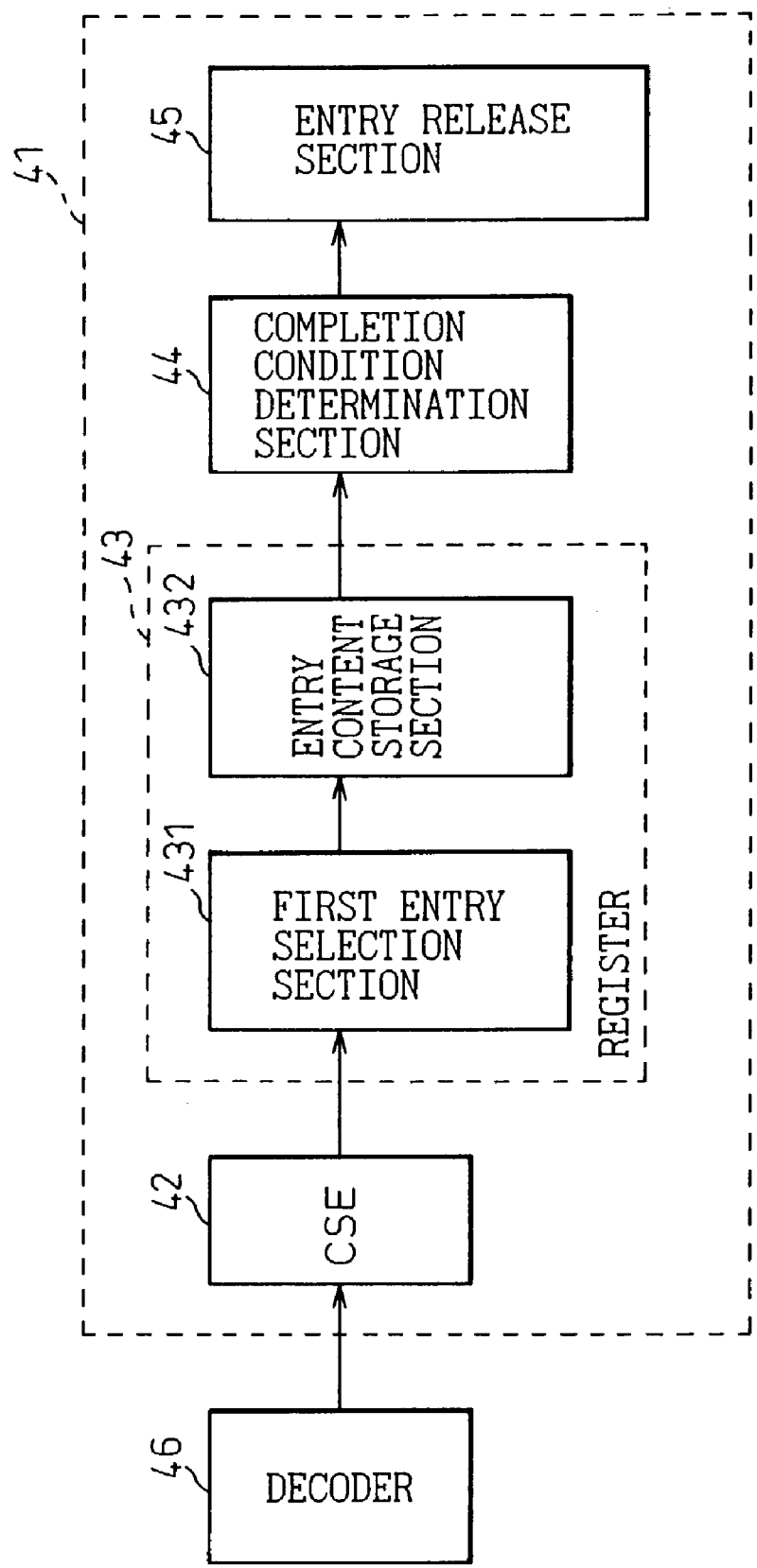

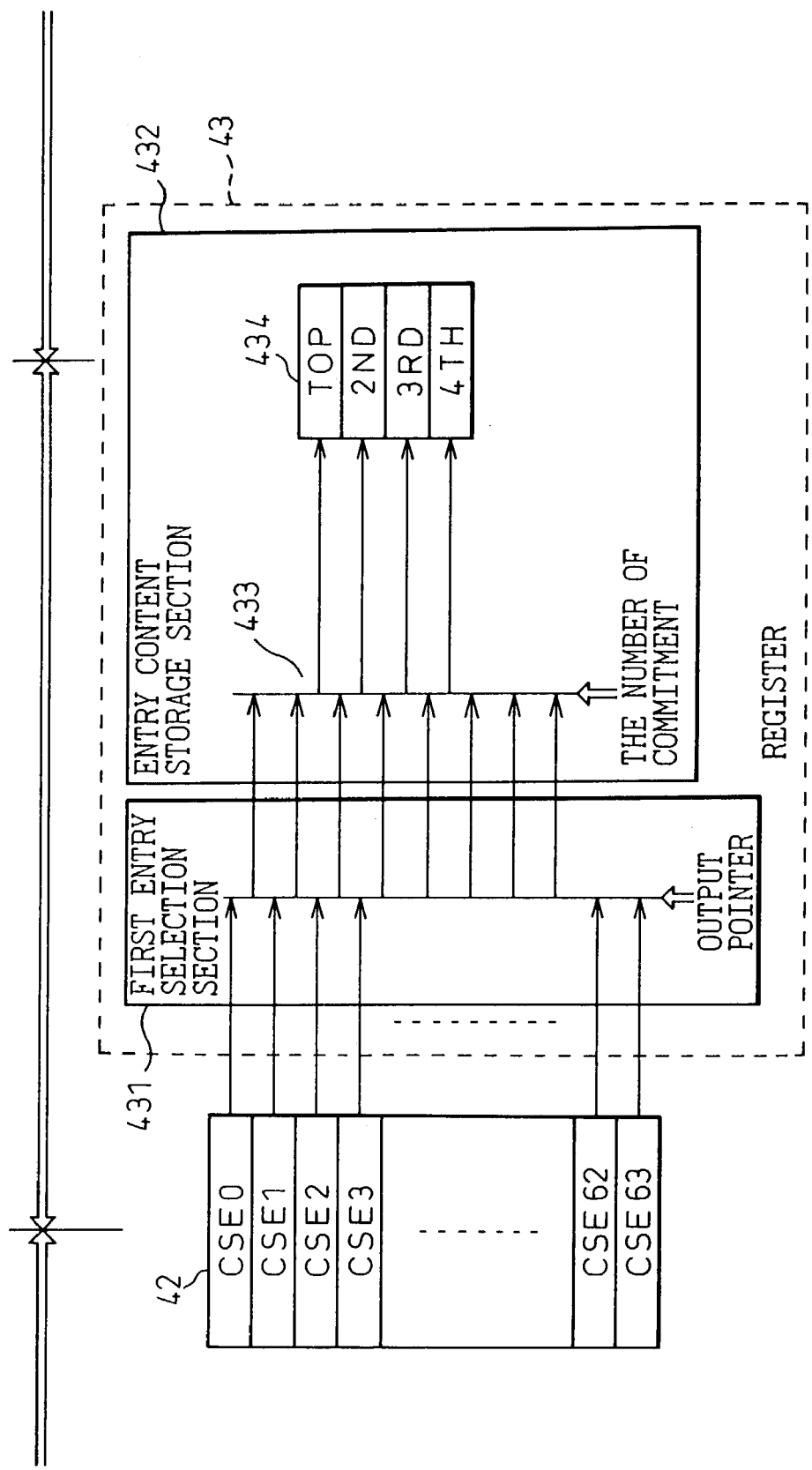

Fig.10
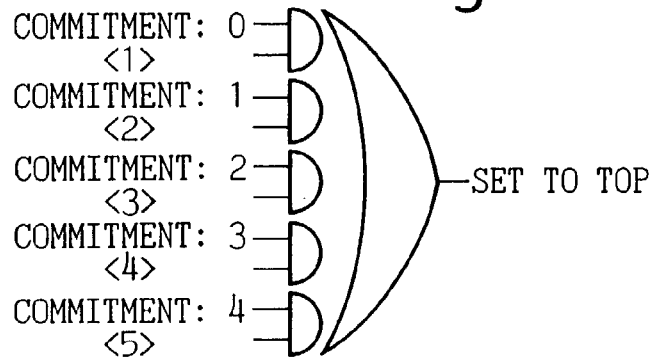
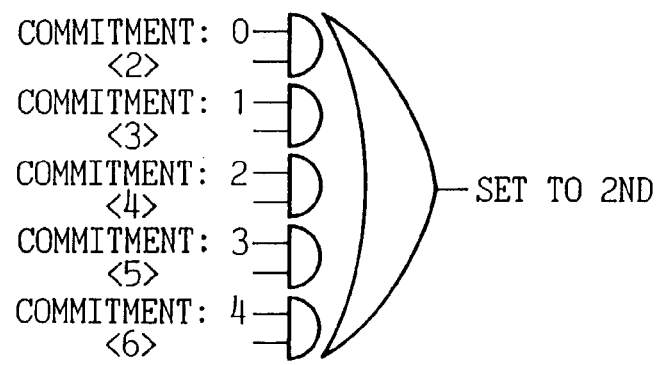
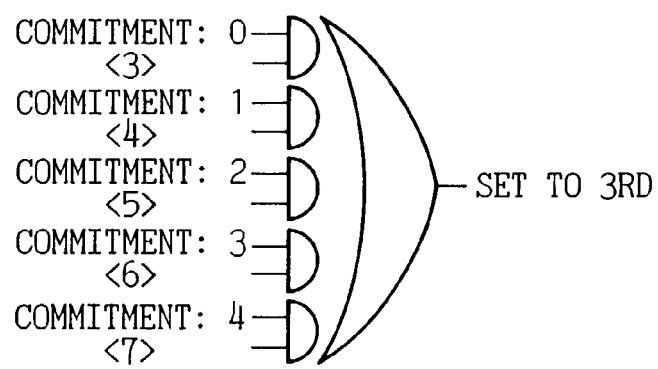
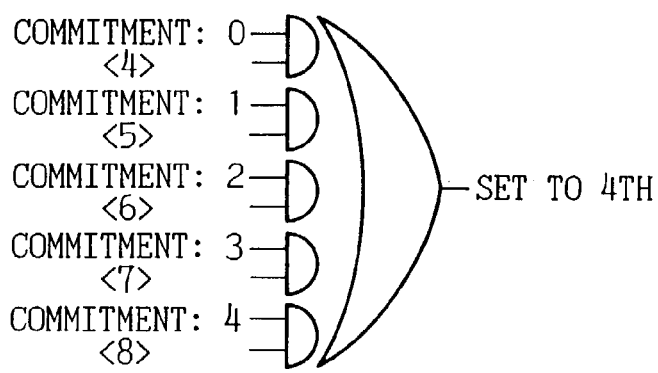

INSTRUCTION EXECUTION APPARATUS COMPRISING A COMMIT STACK ENTRY UNIT

BACKGROUND OF THE INVENTION

1. Field of the Invention

The present invention relates to an instruction execution apparatus in information processing equipment and, more specifically, it relates to an instruction execution apparatus in which the number of entries of an instruction storage device, and a clock frequency, can be increased.

FIG. 1 is a diagram describing a background of the present invention. In this figure, a CPU core section in information processing equipment and, in particular, a computer, is shown. In this figure, the CPU core section comprises an instruction control section 1, an arithmetic unit/result register 2, a first cache 3, and a second cache 4.

The present invention relates to an instruction execution apparatus included in the instruction control section 1.

2. Description of the Related Art

FIG. 2 is a block diagram showing a schematic configuration of the conventional instruction control section 1 shown in FIG. 1. In this figure, there are shown an instruction fetch effective address generator (IFEAG) 201, a branch history address storage section (BRANCH HISTORY) 202, a buffer storage (IFLBS) 203 for storing instructions in the first cache, an instruction buffer (IBUFFER) 204 for fetching and storing the instructions in the first buffer, a decoder 205 for accepting the instructions (four instructions IW0, IW1, IW2 and IW3 in the shown example) at the same time and then issuing them in order, a reservation station address register (RSA) 206 for storing a load instruction address, an effective address generator (EAG) 207, a buffer storage (OPLBS) 208 for storing operands in the first cache, a reservation station for fixed-point arithmetic (RSE) 209, an arithmetic unit for fixed-point arithmetic 210, a reservation station for floating-point arithmetic (RSF) 211, an arithmetic unit for floating-point arithmetic 212, a result register 213 for storing addresses of execution results of instructions such as loads, operations and branches, a general update buffer (GUB) 214 that is a result address buffer for fixed-point arithmetic, a floating address buffer (FUB) 215 that is a result address buffer for floating-point arithmetic, a general purpose register (GPR) 216 for fixed-point arithmetic, a floating purpose register (FRP) 217 for floating-point arithmetic, a reservation station for branch instructions (RSBR) 218, a commitment stack entry (CSE) 219 that will be discussed later in relation to the present invention, and updatable hardware resources 220 such as a next program counter (NPC) and a program counter (PC).

Next, the schematic operation of the above conventional instruction control section will be described.

In response to addresses from the IFEAG 201 or the BRANCH HISTORY 202 via the IFLBS 203, the instruction control section 1 mentioned above stores instructions in the IBUFFER 204, which, in turn, issues instructions, that is four instructions IWR0-IWR3 in the shown example, at the same time. The issue decoder 205 outputs these instructions in order, for example, in the order of IWR0, IWR1, IWR2 and IWR3, which are executed in the EAG 207, the arithmetic units 210 and 212 and the like using a superscalar method, and then, after the instructions such as operations, fetches and branches are completed, entries in the CSE 219 are released in order.

Thus, the CSE 219 is an instruction storage device that stores instructions from the decoder 205 in order and then releases entries in order after the instructions have been executed out of order. Such an instruction storage device will be referred to as the CSE in the following description. Here, the "operation in order" refers to operation in which instructions are processed in the order of issue of the instructions, and the "operation out of order" refers to operation in which instructions are processed irrespective of the order of issue of the instructions.

FIG. 3 is a block diagram showing a schematic configuration of a conventional instruction execution controller. In this figure, the conventional instruction execution controller comprises a decoder that issues instructions in order, a CSE 32 that stores the instructions in order and outputs them in order after the instructions have been executed out of order, a CSE selection section 33 that selects in which entry the instruction is completed among all entries in the CSE 32, a completion condition determination section 34 that determines conditions for actually completing the instruction in the selected entry, and a resource and entry release section 35 that updates CPU resources and releases entries upon completion of the instruction.

The CSE selection section 33 and the completion condition determination section 34 operate within the period of one clock signal cycle.

In this conventional information processing equipment, a process is performed within the period of one cycle of the information processing equipment wherein the entries in the CSE for which instructions should be completed are extracted in the order of execution among all entries in the cycle of CSE completion conditions, then determination of the completion conditions is performed wherein it is determined whether the instructions stored in the extracted entries are completed, and then, if it is determined that the instructions are completed, the entries are released in order. Conventionally, for example, a process wherein three entries are selected from 24 entries in the CSE by the CSE selection section 33 and then the completion conditions are determined is performed in one cycle, however, if the number of entries in the CSE 32 is further increased, the selection of the entries and the determination of the completion conditions may not be completed within one cycle. Moreover, since the clock frequency tends to become increasingly higher, there is a need for a device to allow the operation for the selection of the entries and the determination of the completion conditions to be completed within one cycle.

In order to improve performance of information processing equipment, it is required to increase the number of entries in a CSE and the number of entries that can be released at the same time in one cycle, as well as the clock frequency.

However, considering the circumstances in which the number of all entries in the CSE and the number of the entries released simultaneously in one cycle as well as clock frequency are increased, it will be very difficult to perform the operation in which the entries for which instructions should be completed are extracted, the completion conditions are determined, and then the entries are released in one cycle.

Thus, there is a problem in that the scale of the circuit for extracting entries for which instructions should be completed in one cycle will become larger as the number of entries in the CSE is increased.

Similarly, there is another problem in that, as the number of entries that should be released simultaneously in one cycle is increased, the quantity of circuits that should be controlled simultaneously, and the number of circuit stages will become larger.

Moreover, considering the circumstances in which the clock frequency of the information processing equipment must be faster than conventional equipment, there is still another problem in that it will be very difficult to perform the operation, that was performed in the conventional equipment in only one cycle, for determining conditions to complete instructions.

In particular, as the completion conditions are determined for all entries in the CSE when the instructions are stored in the CSE in order, then the instructions are executed out of order, and then the entries in the CSE are released in order, if the completion of the instructions is delayed, the entries are not released smoothly, and as a result, there is a problem in that operational speed of the computer is reduced since all entries in the CSE 219 are occupied with instructions and the decoder 205 cannot issue instructions.

SUMMARY OF THE INVENTION

Therefore, it is an object of the present invention to provide information processing equipment that allows entries in a CSE to be released smoothly even though the number of all entries in the CSE or clock frequency is increased by determining completion of instructions for entries less than the number of all entries in the CSE.

In order to solve the above problems, according to a first embodiment of the present invention, there is provided an instruction execution apparatus comprising: a register for storing a copy of contents of the maximum number of entries that are executable simultaneously in one cycle with the entry storing the oldest unreleased instruction at the head among all entries in an instruction storage device (in particular, a CSE) at one cycle before the cycle for determining completion conditions of the entries in the instruction storage device after execution of instructions; a completion condition determination section for determining whether the instructions stored in the entries of the register are completed in the cycle for determining completion conditions of the entries in the instruction storage device; and an entry release section for releasing only the entries that are determined to be completed by the completion condition determination section among all entries in the instruction storage device.

According to this first embodiment, as the entries in the CSE can be released only by determining completion of the instructions stored in the entries in the register, the number of which is far less than the number of all entries in the CSE, the instruction execution apparatus can operate with a high-speed clock signal even though the number of all entries in the CSE is increased. Moreover, in comparison with the conventional instruction execution apparatus, there is less possibility that all entries in the CSE are fulfilled with instructions and the decoder cannot issue the instructions when the number of all entries in the CSE is increased.

However, according to this first embodiment, as the operation for determining completion of the entries in the CSE that was conventionally performed in one cycle is shared between two cycles, there is a problem in that the operation must be delayed longer than in the conventional instruction execution apparatus.

In order to solve this problem, according to a second embodiment of the present invention, in the instruction execution apparatus according to the first embodiment described above, the register further comprises an entry selection section that is connected to the instruction storage device, and an entry content storage section for storing a copy of the entries selected by the entry selection section, wherein the entry selection section selects the entries the number of which is more than the maximum number of the entries that are executable simultaneously in one cycle with the entry storing the oldest unreleased instruction at the head among all entries in the instruction storage device at one cycle before the cycle for determining completion conditions of the entries in the instruction storage device after execution of instructions, and the entry content storing section selects the entries for which the completion conditions are determined and stores the copy of the content of such entries from the entries that are selected by the entry selection section, from which the entries for which the completion conditions are determined and which are settled to be released are excluded.

According to this second embodiment, the completion conditions of the entries in the CSE can be determined in every cycle because the entries the number of which is larger than the maximum number of entries that may be completed in one cycle are extracted when the entries subject to completion are selected from all entries in the CSE. In this embodiment, it is possible to determine the completion conditions of the instructions having the oldest execution order that is set in the entry of the register in every cycle.

According to a third embodiment of the present invention, the instruction execution apparatus according to the second embodiment further comprises: a coincidence circuit for detecting whether there is a coincidence between an instruction identifier showing an entry number in the CSE that is sent simultaneously with a completion signal that is generated upon completion of the instruction and an entry number selected by the entry selection section and outputting a flag showing the completion signal of the coincident entries, from which the entries for which the completion conditions are determined and which are settled to be completed in the present cycle are excluded; and a logical OR circuit for performing logical OR operation between the output of the entry selection circuit and the output of the coincidence circuit, wherein the output of the logical OR circuit is stored in the register.

According to this third embodiment, the flag that results from the instruction identifier showing the entry number in the CSE that is sent simultaneously with the completion signal that is generated upon completion of the instruction is set both in the entry of the instruction storage device and the register, the completion conditions of the entry can be determined in the next cycle and the instruction in the entry can be released faster than the case in which the flag is set only in the entry of the instruction storage device.

BRIEF DESCRIPTION OF THE DRAWINGS

FIG. 5 is a block diagram showing a configuration of an instruction execution controller according to a second embodiment of the present invention;

FIG. 6 is a diagram showing an example of a detailed configuration of a CSE and a register shown in FIG. 5;

FIG. 10 is an example of a second entry selection section for setting in a subregister as shown in Table 5;

DESCRIPTION OF THE PREFERRED EMBODIMENTS

Figure 4:
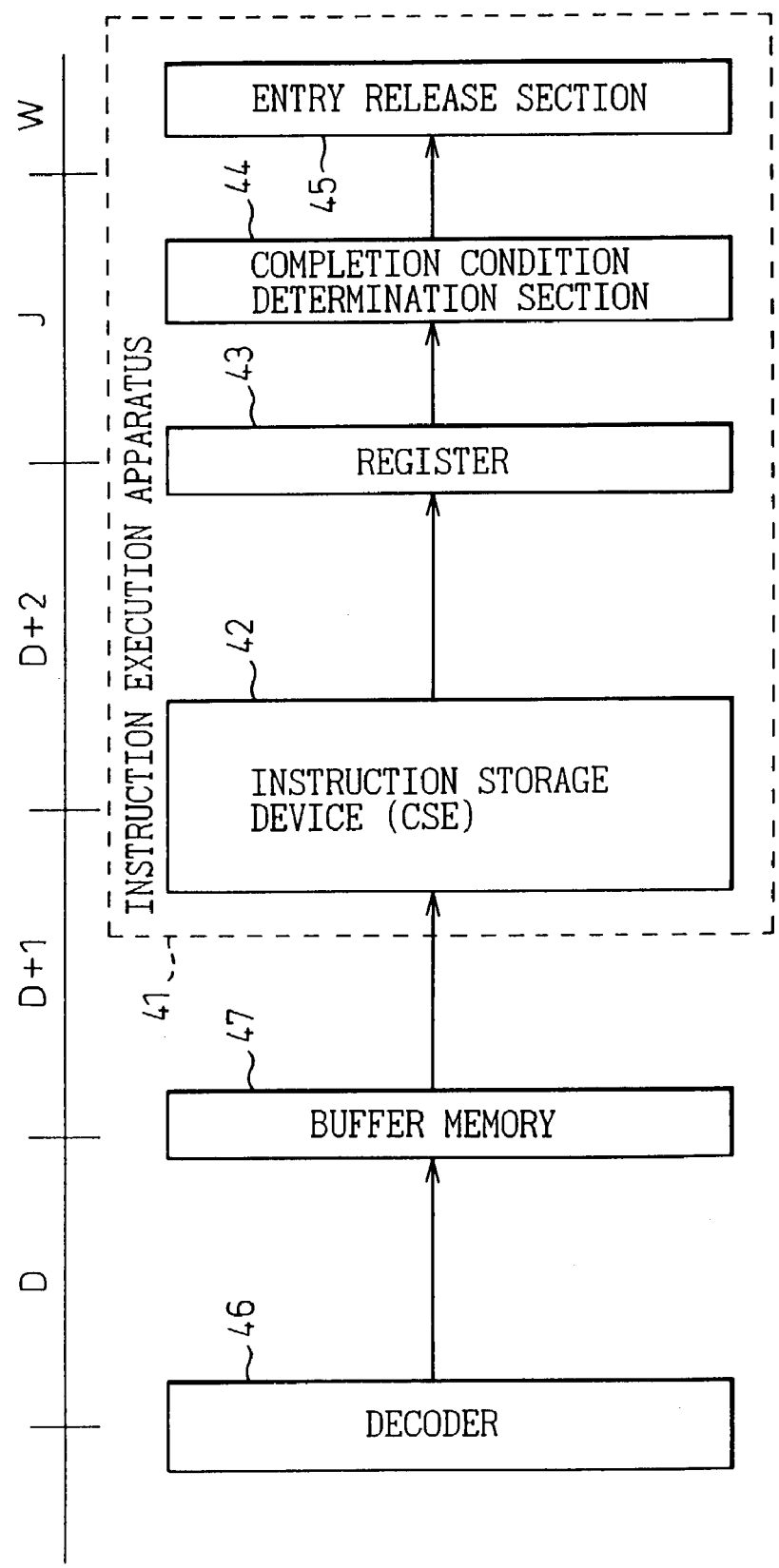
FIG. 4 is a block diagram showing a general process flow for setting instructions decoded by a decoder in a register in the instruction execution controller according to a first embodiment of the present invention.

FIG. 4 is a block diagram showing a general process flow for setting instructions decoded by a decoder in a register in an instruction execution controller according to a first embodiment of the present invention. In this figure, the instruction execution controller 41 according to this embodiment comprises an instruction storage device (CSE) 42, the register 43, a completion condition determination section 44, and an entry release section 45.

At the upper side of this figure, D, D+1, D+2 designate three continuous cycles for decoding process, J designates a cycle for determining completion conditions, and W designates a cycle for updating resources of an information execution apparatus when an entry is released. A cycle for executing an instruction is not shown in this figure.

The instructions decoded by the decoder 46 are issued in order and then executed out of order using a superscalar method in a cycle, that is not shown, just as conventionally. The decoded instructions are once stored in a buffer memory 47 in cycle D, and then stored in empty entries among a plurality of entries in the CSE 42 in order in cycle D+1. The number of entries in the CSE 42 is 64, for example.

In a register 43, at one cycle before the cycle J for determining completion conditions of the entries in the CSE 42 after execution of the instructions, a copy of contents of the maximum number of entries that can be completed simultaneously in one cycle is stored with the entry storing the oldest unreleased instruction at the head among all entries in the CSE 42. The number of the entries that can be completed simultaneously in one cycle is equal to the number of instructions issued from the decoder 46 simultaneously. For example, when four instructions are issued from the decoder 46 simultaneously, four entries can be completed simultaneously in one cycle.

The completion condition determination section 44 determines whether the instructions stored in the entries of the register 43 are completed in cycle J for determining completion conditions of the entries in the CSE 42.

The entry releasing section 45 releases only the entries that are determined to be completed by the completion condition determination section 44.

According to this first embodiment, it is not necessary to determine completion of the instructions for all entries in the CSE 42, and the entries in the CSE 42 can be released only by determining completion of the instructions stored in the entries in the register 43. Therefore, even though clock frequency as well as the number of entries in the CSE 42 is increased, the entries in the CSE can be released smoothly and the situation in which the decoder 46 must halt issuing instructions will occur less frequently, as a result of which the reduction in processing speed of the information processing equipment can be prevented.

However, in the first embodiment described above, as two cycles consisting of cycle D+2 for storing the entries and cycle J for determining completion conditions are needed to determine completion conditions of the entries in the CSE 42, there is a problem in that one more cycle is needed than the conventional instruction execution controller in which completion conditions of the entries in the CSE can be determined in every cycle.

Therefore, this problem is solved in a second embodiment of the present invention.

FIG. 5 is a block diagram showing a configuration of instruction execution controller according to the second embodiment of the present invention. The instruction execution controller in FIG. 5 differs from the one in FIG. 4 in that the register 43 is comprised of a first entry selection section 431 and an entry content storage section 432.

The first entry selection section 431 selects entries the number of which is more than the maximum number of entries that can be completed simultaneously in one cycle with the entry storing the oldest unreleased instruction at the head among all entries in the CSE 42 at one cycle before the cycle for determining completion conditions of the entries in the CSE 42 after execution of the instruction.

The entry content storage section 432 stores a copy of contents of the entries for which the completion conditions are determined among the entries selected by the first entry selection section 431, from which the entries for which the completion conditions are determined, and which are settled to be released, are excluded.

FIG. 6 is a diagram showing an example of a detailed configuration of the CSE 42 and the register 43 shown in FIG. 5. In this figure, the CSE 42 has 64 entries CSE0-CSE63. The register 43 comprises the first entry selection section 431 and the entry content storage section 432. Further, it is assumed that the decoder 46 issues four instructions simultaneously.

The first entry selection section 431 selects eight entries the number of which is more than four, or the maximum number of entries that can be completed simultaneously in one cycle by using an output pointer <5:0> that indicates the instruction of the oldest execution order in the present cycle among the 64 entries stored in the CSE 42. Here, <5:0> means that each number of 64 entries from 0 to 63 is indicated by 6 bits from the 0-th bit to the 5-th bit.

The entry content storage section 432 comprises a second entry selection section 433 for selecting the entries the number of which is four, or the maximum number of the entries that can be completed simultaneously in one cycle from all of the entries selected by the first entry selection section 431 according to the number of commitment described later in detail, and a subregister 434 for storing a copy of contents of the entries selected by the second entry selection section 433.

As an example of a way to select the eight entries in the first entry selection section 431, a group of eight values of output pointer <5:0>, output pointer +1<5:0>, - - -, and output pointer +7<5:0> is acquired and set in a latch in every cycle. An example of the group of the eight output pointers is shown in Table 1 below.

TABLE 1

| CSE numbers |
| --- |
| Output pointer <5:0> + 0 Group 0: 0, 8, 16, 24, 32, 40, 48, 56 |
| Output pointer <5:0> +1 Group 1: 1, 9, 17, 25, 33, 41, 49, 57 |
| Output pointer <5:0> +2 Group 2: 2, 10, 18, 26, 34, 42, 50, 58 |
| Output pointer <5:0> +3 Group 3: 3, 11, 19, 27, 35, 43, 51, 59 |
| Output pointer <5:0> +4 Group 4: 4, 12, 20, 28, 36, 44, 52, 60 |
| Output pointer <5:0> +5 Group 5: 5, 13, 21, 29, 37, 45, 53, 61 |
| Output pointer <5:0> +6 Group 6: 6, 14, 22, 30, 38, 46, 54, 62 |
| Output pointer <5:0> +7 Group 7: 7, 15, 23, 31, 39, 47, 55, 63 |

In Table 1, Group 0 in the first line is a group in which the least significant three bits of the 6-bit output pointer 0 are 000, and Group 1 in the second line is a group in which the least significant three bits of the 6-bit output pointer +1 are 001. Similarly, in the third and further lines, there are groups in which the least significant three bits of the 6-bit output pointer are 010, 011, and so on.

One CSE is selected from each of the eight groups. For such selection, eight values such as Output pointer +0<5:3>, Output pointer +1<5:3>, - - -, and Output pointer +7<5:3> are used as selection signals. Here, <5:3> means the most significant three bits of the 6-bit output pointers. In other words, values shown in Table 2 below are used as the selection signals.

TABLE 2

| Group 0: Output pointer +7 <5:3> |
| --- |
| Group 1: Output pointer +6 <5:3> |
| Group 2: Output pointer +5 <5:3> |
| Group 3: Output pointer +4 <5:3> |
| Group 4: Output pointer +3 <5:3> |
| Group 5: Output pointer +2 <5:3> |
| Group 6: Output pointer +1 <5:3> |
| Group 7: Output pointer +0 <5:3> |

For example, if the value of an output pointer is 10, the selection signal of Group 0 is the most significant three bits of 10+7=17, or the most significant three bits of 010001, or 010, and the selection signal of Group 1 is the most significant three bits of 10+6=16, or the most significant three bits of 010000, or 010, too. The selection signals of Group 2 and further groups can be acquired similarly.

Using the selection signals described above, entry numbers are selected as shown in Table 3 below.

TABLE 3

| | Values of selection signals <5:3> | | | | | | | | |
| --- | --- | --- | --- | --- | --- | --- | --- | --- | --- |
| | 000 | 001 | 010 | 011 | 100 | 101 | 110 | 111 | |
| Group 0: | 0 | 8 | 16 | 24 | 32 | 40 | 48 | 56 | (1) |
| Group 1: | 1 | 9 | 17 | 25 | 33 | 41 | 49 | 57 | (2) |
| Group 2: | 2 | 10 | 18 | 26 | 34 | 42 | 50 | 58 | (3) |
| Group 3: | 3 | 11 | 19 | 27 | 35 | 43 | 51 | 59 | (4) |

TABLE 3-continued

| | Values of selection signals <5:3> | | | | | | | | |
| --- | --- | --- | --- | --- | --- | --- | --- | --- | --- |
| | 000 | 001 | 010 | 011 | 100 | 101 | 110 | 111 | |
| Group 4: | 4 | 12 | 20 | 28 | 36 | 44 | 52 | 60 | (5) |
| Group 5: | 5 | 13 | 21 | 29 | 37 | 45 | 53 | 61 | (6) |
| Group 6: | 6 | 14 | 22 | 30 | 38 | 46 | 54 | 62 | (7) |
| Group 7: | 7 | 15 | 23 | 31 | 39 | 47 | 55 | 63 | (8) |

For example, when the value of an output pointer is 10, the selection signal is 010 as described above, and therefore the entry number 16 is selected from Group 0 and the entry number 17 is selected from Group 1.

Figure 7A:
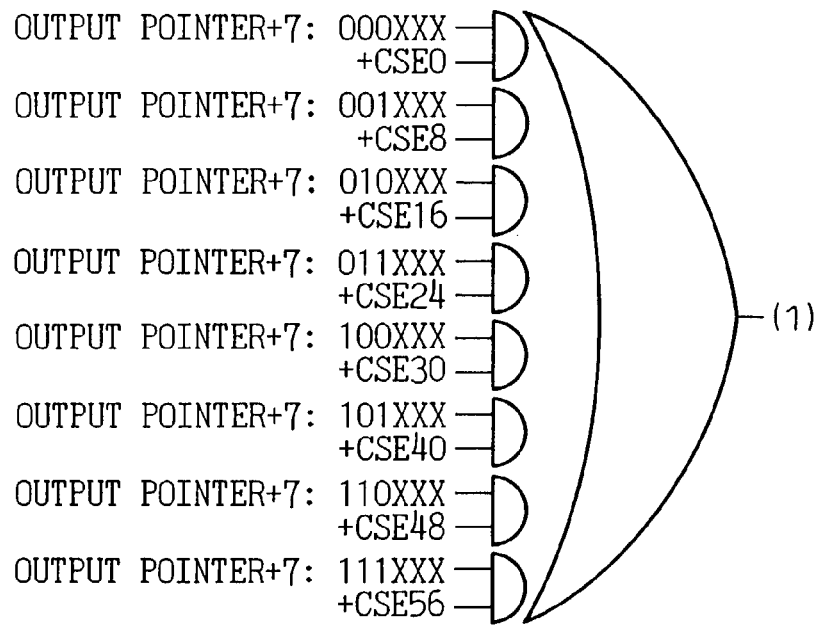
FIG. 7A shows an entry number selection circuit when a selection signal is 000-111 for Group 0 in Table 3.

FIG. 7A shows a selection circuit for Group 0 when the selection signal is 000-111. As shown, in Group 0, when the selection signal is 000, the entry number 0 is selected as a flag, and when the selection signal is 001, the entry number 8 is selected as a flag, and so on.

Figure 7B:
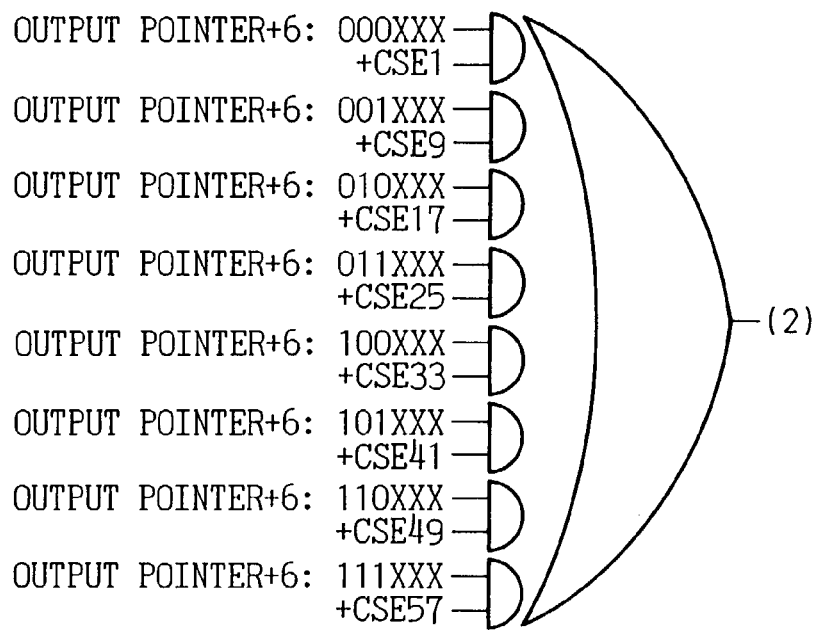
FIG. 7B shows an entry number selection circuit when a selection signal is 000-111 for Group 1 in Table 3.

FIG. 7B shows a selection circuit for Group 1 when the selection signal is 000-111. As shown, in Group 1, when the selection signal is 000, the entry number 1 is selected as a flag, and when the selection signal is 001, the entry number 9 is selected as a flag, and so on.

Group 2 and further groups can be considered similarly by reducing the output pointer value one by one, which are not shown in the figure.

Next, by using the least significant three bits of eight values such as Output pointer <2:0>, Output pointer +1<2:0>, - - -, and OUT_PTR+7<2:0> as selection signals, the selected entry numbers from (1) to (8) are re-sorted in the order in which the instructions have been executed, as shown in Table 4 below.

TABLE 4

| | Value of selection signals <2:0> | | | | | | | |
| --- | --- | --- | --- | --- | --- | --- | --- | --- |
| | 000 | 001 | 010 | 011 | 100 | 101 | 110 | 111 |
| Output pointer +0 <2:0> | (1) | (2) | (3) | (4) | (5) | (6) | (7) | (8) <1> |
| Output pointer +1 <2:0> | (1) | (2) | (3) | (4) | (5) | (6) | (7) | (8) <2> |
| Output pointer +2 <2:0> | (1) | (2) | (3) | (4) | (5) | (6) | (7) | (8) <3> |
| Output pointer +3 <2:0> | (1) | (2) | (3) | (4) | (5) | (6) | (7) | (8) <4> |
| Output pointer +4 <2:0> | (1) | (2) | (3) | (4) | (5) | (6) | (7) | (8) <5> |
| Output pointer +5 <2:0> | (1) | (2) | (3) | (4) | (5) | (6) | (7) | (8) <6> |
| Output pointer +6 <2:0> | (1) | (2) | (3) | (4) | (5) | (6) | (7) | (8) <7> |
| Output pointer +7 <2:0> | (1) | (2) | (3) | (4) | (5) | (6) | (7) | (8) <8> |

Figure 8A:
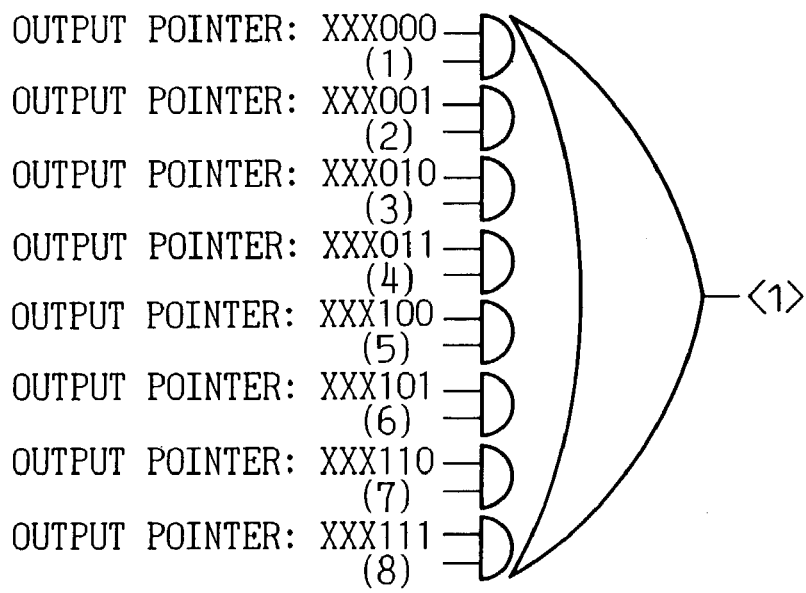
FIG. 8A shows a circuit for selecting a group shown in <1> in the case of an output pointer +0<2:0>.

FIG. 8A shows a circuit for selecting a group shown in <1> above for the output pointer +0<2:0>. As shown, when the least significant bits of the output pointer +0 are 000-111, the entry numbers shown in (1)-(8) of FIG. 3 are selected, respectively.

Figure 8B:
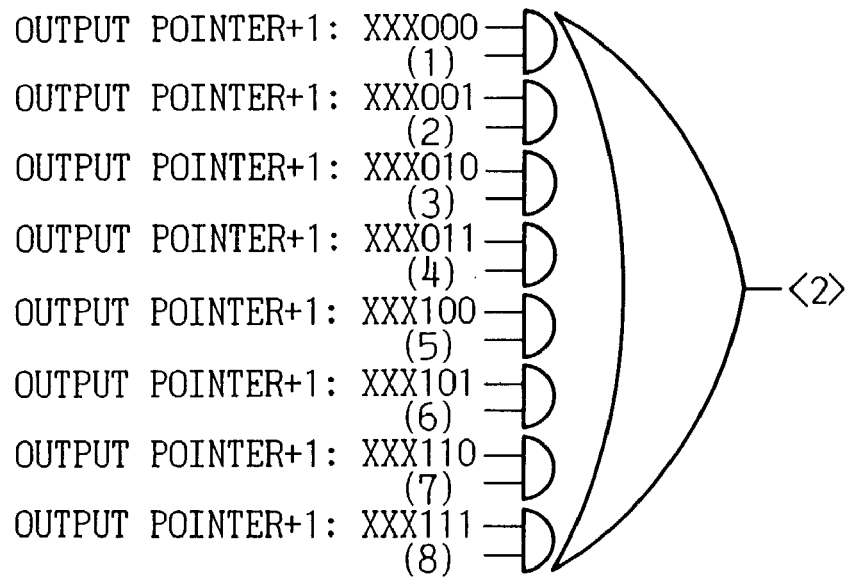
FIG. 8B shows a circuit for acquiring <2> in the case of an output pointer +1<2:0>.

FIG. 8B shows a circuit for acquiring <2> shown above for the output pointer +1<2:0>. As shown, when the least significant three bits of the output pointer +1 are 000-111, the entry numbers shown in (1)-(8) of FIG. 3 are selected, respectively.

Figure 1:
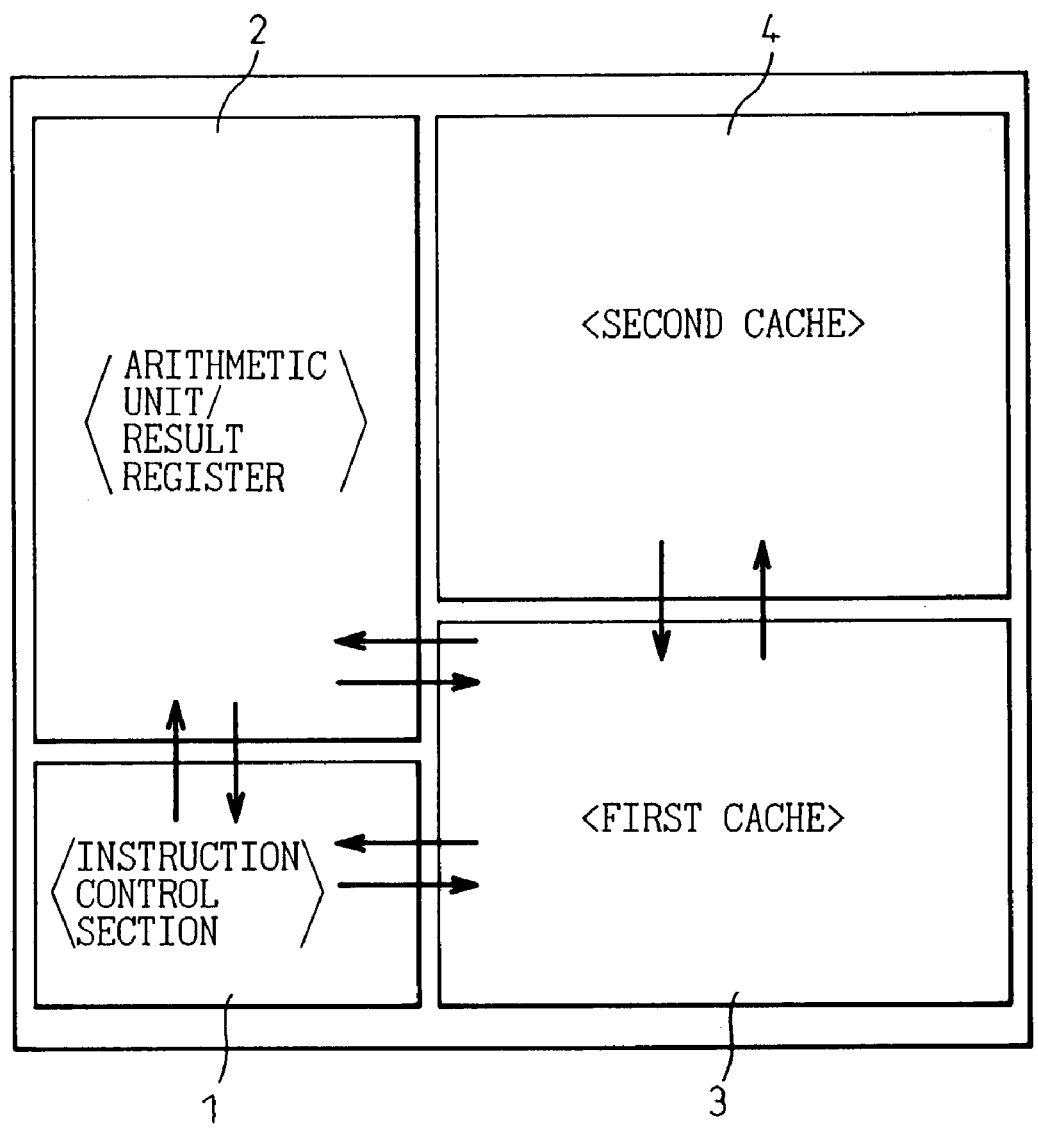
FIG. 1 is a diagram describing a background of the present invention.
Figure 2:
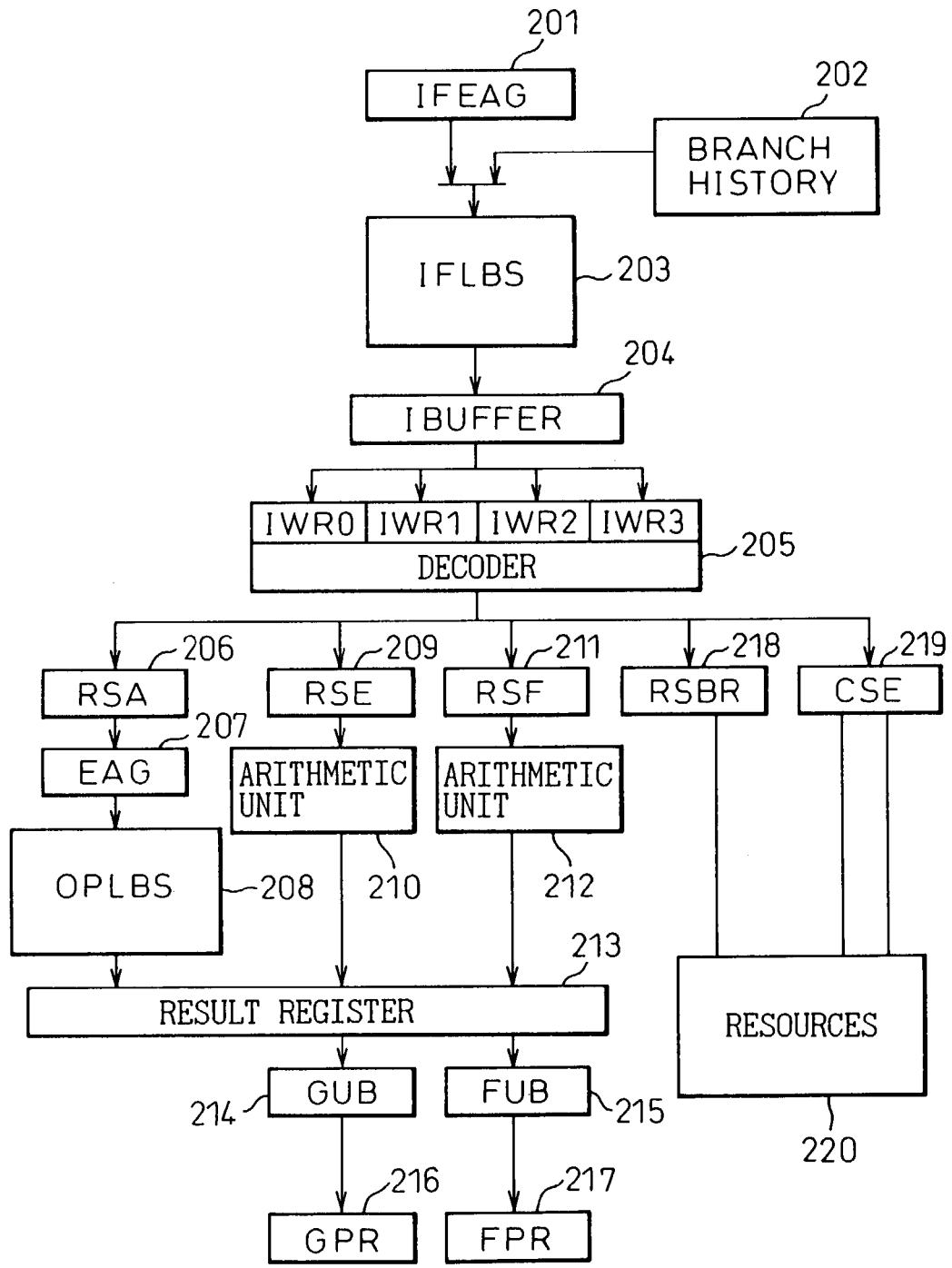
FIG. 2 is a block diagram showing a schematic configuration of a conventional instruction control section 1 shown in FIG. 1.
Figure 3:
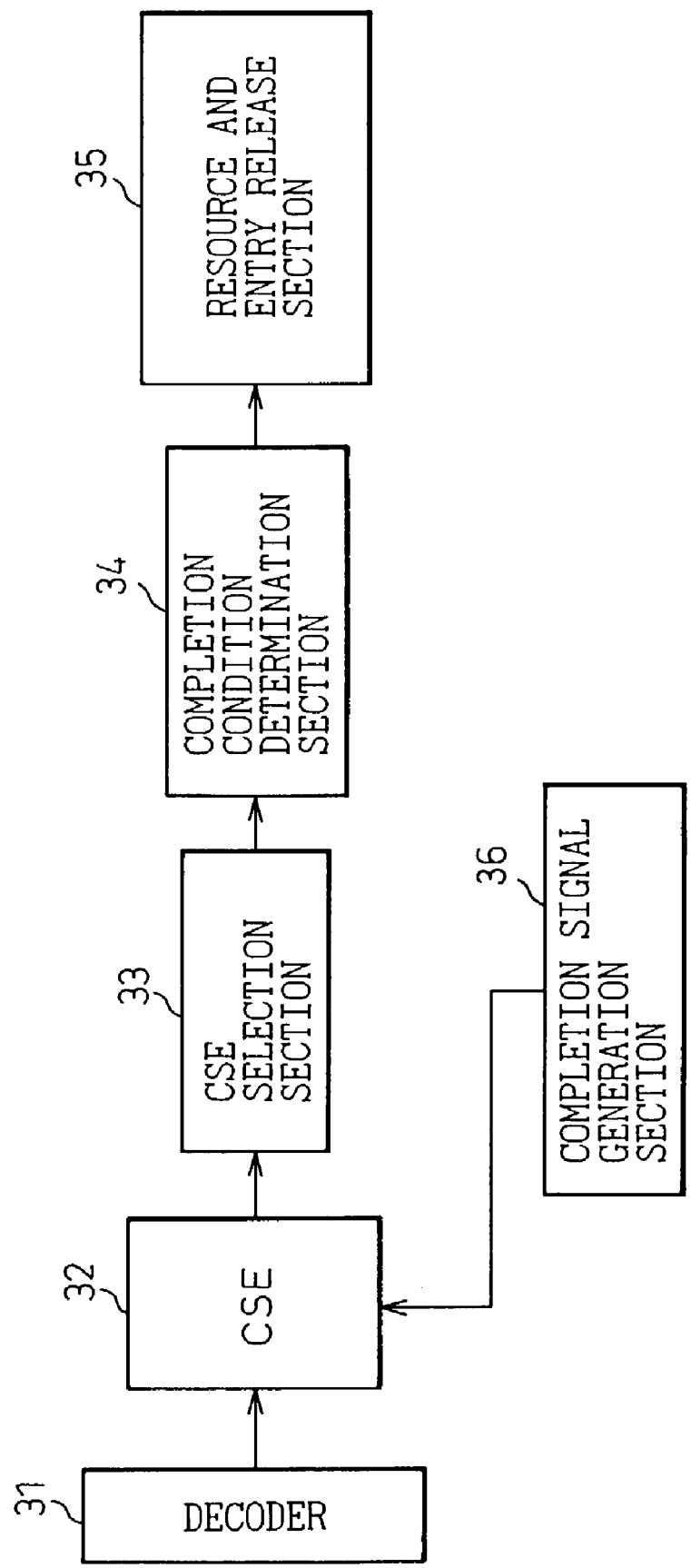
FIG. 3 is a block diagram showing a schematic configuration of a conventional instruction execution controller.

Similarly, also for the output pointer +2 and further output pointers, when the least significant three bits are 000-111, the entry numbers shown in (1)-(8) of FIG. 3 are selected.

As described above, at the output of the first entry selection section 431, eight entries selected from the CSE 42 are acquired.

Next, the second entry selection section 433 in the entry content storage section 432 selects up to four entries that are subject to completion in the next cycle from the eight entries that have been selected by the entry selection section.

The number of entries subject to completion in the next cycle is determined by the number of commitment in the present cycle, which is the number of the entries having the instructions that have been completed.

Figure 9:
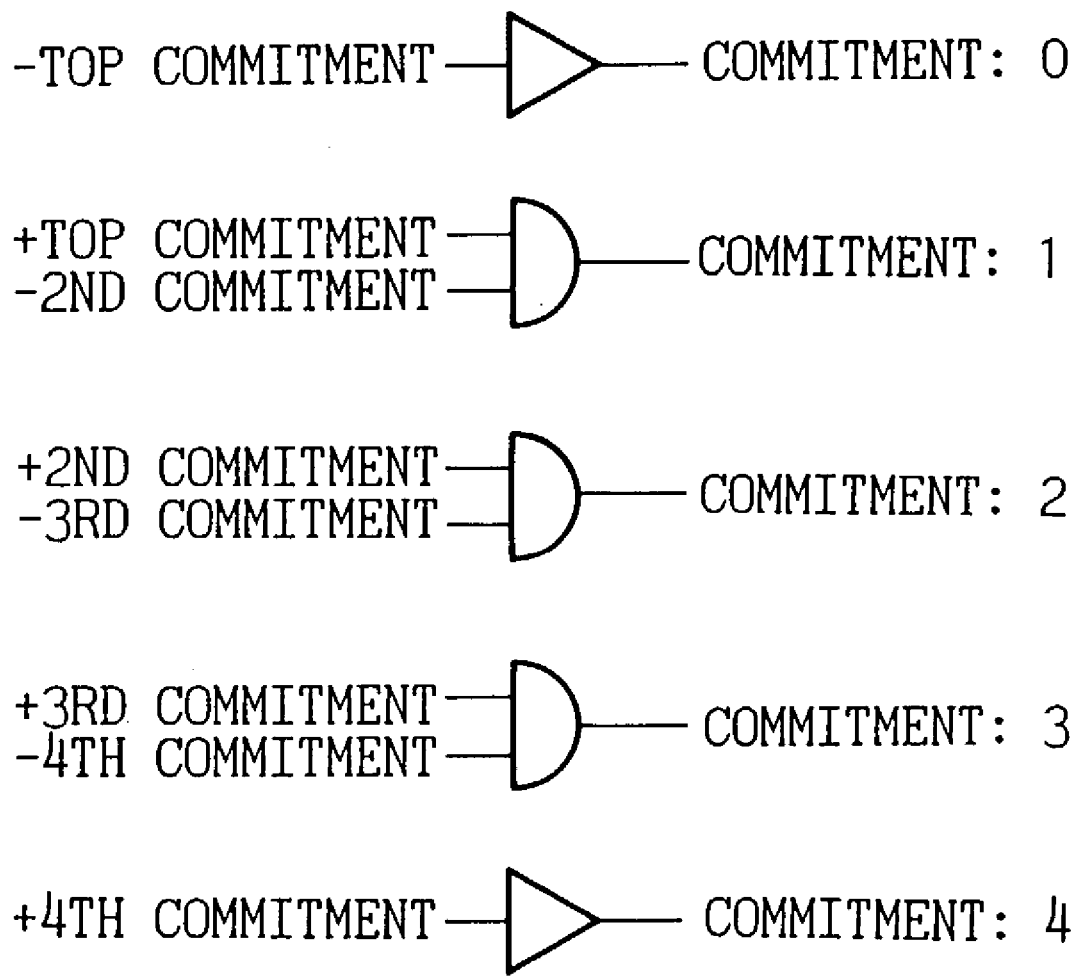
FIG. 9 is a circuit diagram for determining the number of a commitment.

FIG. 9 shows a circuit diagram for determining the number of commitments. As shown, the number of commitments is 0 if the top entry in the subregister 434 has not been completed, 1 if the top entry has completed but the 2ND has not been completed, 3 if the 2ND has completed but the 3RD has not been completed, and 4 if the 3RD has completed but the 4TH has not been completed. It is because the instructions should be completed in order and therefore, if the TOP has not been committed, the 2ND, 3RD and 4TH cannot be committed. Similarly, if the 2ND has not been committed, the 3RD and 4TH cannot be committed, and if the 3RD has not been committed, the 4TH cannot be committed.

Using the number of a commitment as a selection signal, the second entry selection section 433 (FIG. 6) selects the entries in the CSE that are to be set in the subregister 434 as shown in Table 5 below.

TABLE 5

| The number of a commitment | TOP | 2ND | 3RD | 4TH |
|---|---|---|---|---|
| 0 | <1> | <2> | <3> | <4> |
| 1 | <2> | <3> | <4> | <5> |
| 2 | <3> | <4> | <5> | <6> |
| 3 | <4> | <5> | <6> | <7> |
| 4 | <5> | <6> | <7> | <8> |

FIG. 10 is an example of the second entry selection section 433 for setting the entries in the subregister 434 as shown in Table 5. As seen from FIGS. 5 and 10, if the number of commitment is 0, the entries in the subregister 434 cannot be completed and therefore the same entries as in the previous cycle are copied, and if the number of a commitment increases by one, one entry has completed and the content of the next entry is copied. Thus, the contents of the four entries are stored in the order of execution in the subregister 434.

As described above, the eight entries that are more than four, or the maximum number of entries that have the possibility to be completed in one cycle are selected first, and then, from these firstly selected eight entries, the second entry selection section 433 selects four entries and sets these entries as the four entries from TOP to 4TH in the subregister 434 according to the number of a commitment. Only such entries set in the subregister 434 are subject to the determination of the completion conditions in the completion condition determination cycle. It allows the determination of completion conditions to be performed in every cycle.

Figure 11:
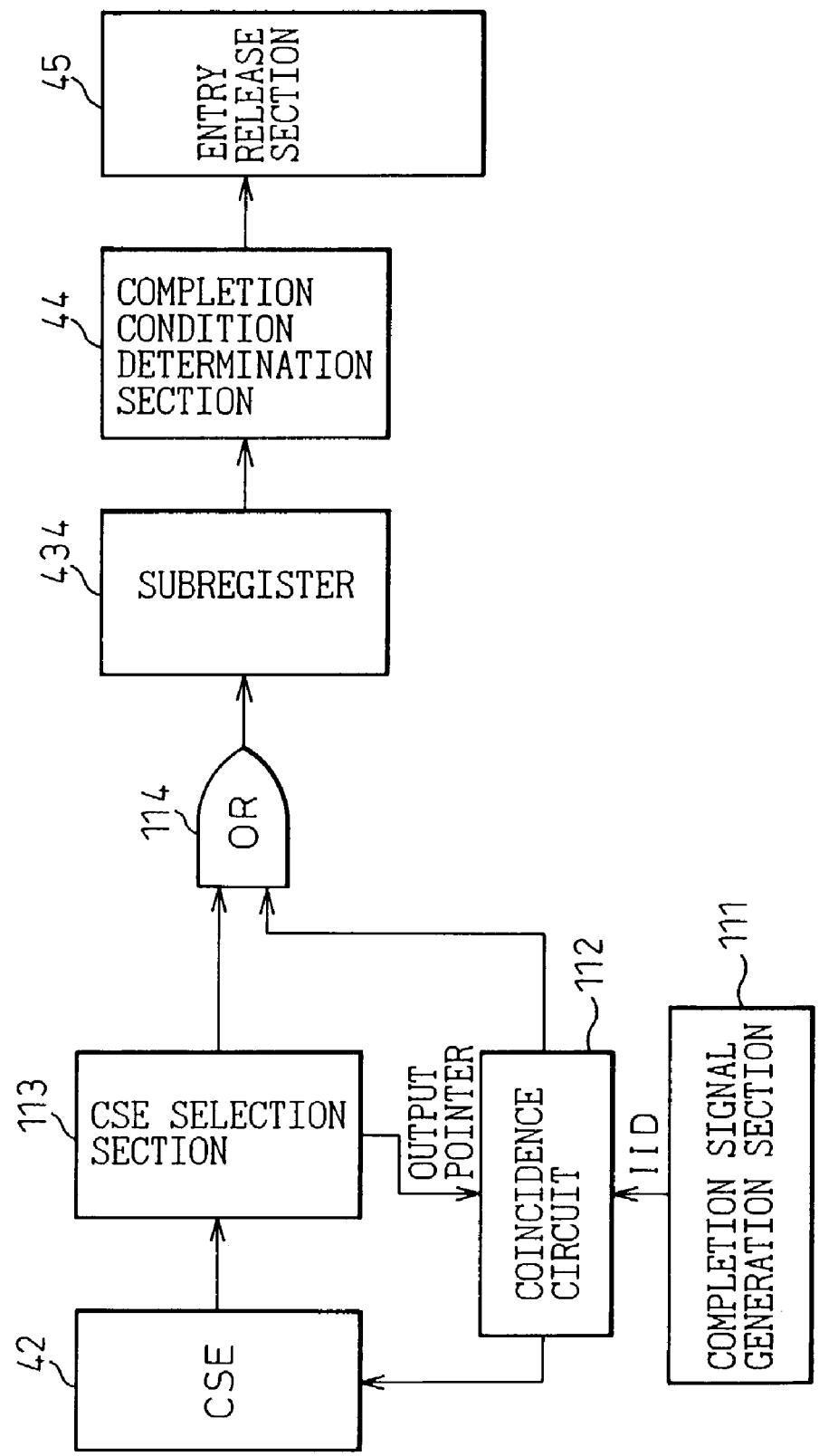
FIG. 11 is a block diagram showing a configuration of an instruction execution controller according to a third embodiment of the present invention.

FIG. 11 is a block diagram showing a configuration of an instruction execution apparatus according to a third embodiment of the present invention. In this figure, elements similar to the ones in FIG. 5 are designated by similar reference numerals. The embodiment shown in FIG. 11 differs from the one in FIG. 5 in that a completion signal generation 111, a coincidence circuit 112, a CSE selection section 113 and a logical OR circuit 114 are provided and the flag is not input to the CSE 42 from the decoder in this embodiment.

When an instruction, such as one for any operation, fetch or branch stored in an entry in the CSE, is completed, a completion signal is generated in the completion signal generation section 111. Conventionally, a flag representing the completion conditions was set only in the corresponding entry in the CSE 42 and the completion conditions were determined in the next cycle, but, when the register 43 having up to four entries, that have the possibility to be completed in one cycle, is provided as in the first and second embodiments, if the flag representing the completion signal is set only in the CSE 42, the entry cannot be completed in the next cycle and the completion of the entry will be delayed for one cycle in comparison with the conventional instruction execution apparatus.

Therefore, in this embodiment, the flag representing the instruction completion signal is set not only in the CSE 42 but also in the register 43. It allows the completion conditions of the corresponding entry in the CSE 42 to be determined in the cycle subsequent to the sending of the completion signal, just as in the conventional instruction execution apparatus.

Next, an operation of the apparatus shown in FIG. 11 will be described.

When each instruction is completed, an instruction identifier (IID) is sent to the CSE simultaneously with the completion of the instruction. This IID indicates an entry number in the CSE 42. The coincidence circuit 112 compares this IID with a plurality of output pointers the minimum value of which is the output pointer in the present cycle in the CSE 42, and then, if any matching output pointer is found, the entries (eight entries in the embodiment in FIG. 6) the number of which is more than the maximum number of entries that can be released in one cycle (four entries in the embodiment in FIG. 6) including the entry that corresponds to the output pointer are selected from all entries in the CSE 42, and then, from the entries which are thus selected, according to the number of commitment, a flag for the maximum number of entries that can be released in one cycle is set in the CSE 42 and output to the logical OR circuit 114.

As a result of the collation described above, if there is no match between the IID and the output pointers, the completion conditions of the entry corresponding to the IID will not be completed in the next cycle, and therefore, the flag is not set in the subregister 434, but it is set only in the corresponding entry of the CSE 42.

The CSE selection section 113 is equivalent to a combination of the first entry selection 431 and the second entry selection section 433 in the entry content storage section 432 shown in FIG. 6.

The logical OR circuit 114 performs a logical OR operation between the output of the CSE selection circuit 113 and the output of the coincidence circuit and stores the result in the subregister 434.

The operation of the completion condition determination section 44 and the entry release section 45 is similar to the one shown in FIG. 6, the description of which is omitted.

Figure 12:
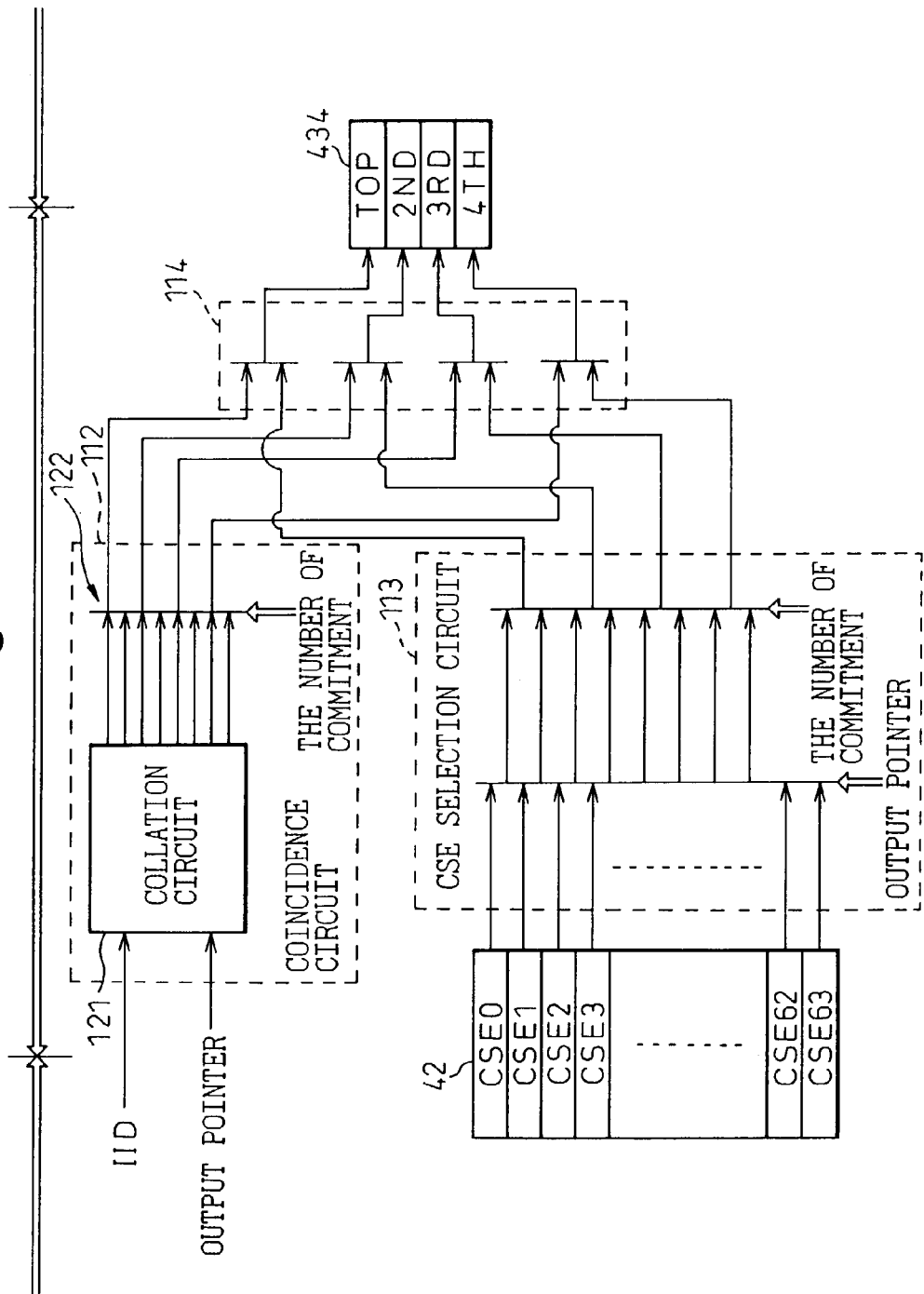
FIG. 12 is a circuit diagram showing a portion of the instruction execution controller shown in FIG. 11 in detail.

FIG. 12 is a circuit diagram showing a portion of the instruction execution controller shown in FIG. 11 in detail. As shown, the CSE selection section 113 is equivalent to a combination of the first entry selection section 431 and the second entry selection section 433 in the entry content storage section 432 in FIG. 6.

The coincidence circuit 112 comprises the collation circuit 121 and the third entry selection section 122. The collation circuit 121 collates the instruction identifier IID and the output pointer to select eight entries, as described in detail later. The third entry selection section 122 selects four entries from the output of the collation circuit 12 based upon the number of commitment.

The logical OR between the output of the coincidence circuit 112 and the output of the CSE selection circuit 113 is calculated by the logical OR circuit 114 and stored in the subregister 434.

More specifically, the collation circuit 121 collates the 6-bit IID with each of the eight 6-bit output pointers including output pointer <5:0>, output pointer +1<5:0>, - - -, and output pointer +7<5:0>. If there is a match between the IID and any of these eight output pointers, the result will be as shown in Table 6. Here, the IID is collated each of these eight output pointers so that the flag for the entries for which the completion conditions have not determined can be set in the subregister 434 even if the completion conditions of the maximum number of entries (four entries) are determined and settled to be released in the present cycle.

TABLE 6

| | |
|---|---|
| Output pointer +0 ——— | (1) |
| Output pointer +1 ——— | (2) |
| Output pointer +2 ——— | (3) |
| Output pointer +3 ——— | (4) |
| Output pointer +4 ——— | (5) |
| Output pointer +5 ——— | (6) |
| Output pointer +6 ——— | (7) |
| Output pointer +7 ——— | (8) |

Figure 13A:
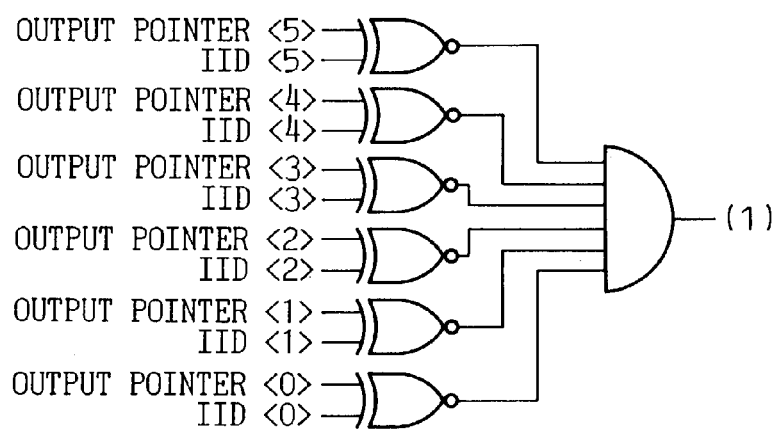
FIGS. 13A and 13B are detailed circuit diagrams of a portion of a collation circuit 121 shown in FIG. 12.
Figure 13B:
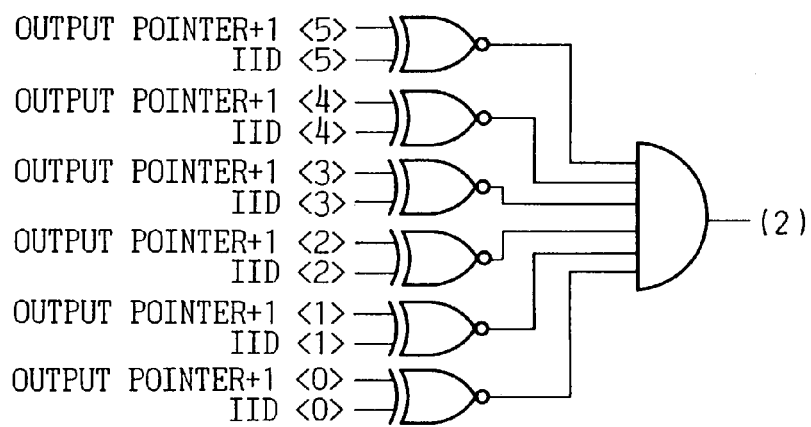

FIGS. 13A and 13B show a detailed circuit diagram of a portion of the collation circuit 121 shown in FIG. 12. FIG. 13A indicates a circuit for deriving (1) in the above table by collating the IID with the output pointer +0. The logic circuit shown in the uppermost part in this figure outputs a logical ENOR between the fifth bit <5> of the IID and the fifth bit <5> of the output pointer +0. Thus, it outputs "1" if there is a match. Similarly, the IID is compared with each of the fourth—zeroth bits, and then, "1" is output if there is a match. When all output values of these ENOR output are "1", the value of (1) is "1".

FIG. 13B indicates a circuit for deriving (2) in the above table by collating the IID with the output pointer +1. The logic circuit shown in the uppermost part in this figure outputs a logical ENOR between the fifth bit <5> of the IID and the fifth bit <5> of the output pointer +1. Thus, it outputs "1" if there is a match. Similarly, the IID is compared with each of the fourth—zeroth bits, and then, "1" is output if there is a match. When all output values of these ENOR output are "1", the value of (1) is "1".

Similar collation will be performed for other output pointers, wherein the value of the output pointers will increase one by one.

Next, it is determined whether to set a flag in the subregister 434 using the number of commitment in the present cycle as a selection signal as shown in Table 7 below.

TABLE 7

| The number of a commitment | TOP | 2ND | 3RD | 4TH |
|---|---|---|---|---|
| 0 | (1) | (2) | (3) | (4) |
| 1 | (2) | (3) | (4) | (5) |
| 2 | (3) | (4) | (5) | (6) |

TABLE 7-continued

| The number of a commitment | TOP | 2ND | 3RD | 4TH |
|---|---|---|---|---|
| 3 | (4) | (5) | (6) | (7) |
| 4 | (5) | (6) | (7) | (8) |

The operation for this selection is similar to the one of the second entry selection section 433 in FIG. 6 and therefore, it can be implemented similarly by substituting (1)-(8) for <1>-<8> in the circuit shown in FIG. 10.

As described above, by performing logical OR operation between the selected entries from TOP to 4TH and the entries selected from 64 entries in the CSE 42 by the CSE selection section 113, the flag indicating the completion of any instruction, such as an operation, fetch or branch stored in the entries in the CSE 42, can be set in the subregister in the same cycle in which the corresponding completion signal is sent and, therefore, the completion conditions of the entries storing the corresponding instruction can be determined in the next cycle. In the cycle in which the instruction completion signal is sent to the CSE 42, if there is no match between the IID associated with the completion signal and the each of the eight output pointers, or if the flag is not set in the subregister 434 due to the number of commitment, the flag indicating the completion is set only in the corresponding entries in the CSE 42.

If the signal to release all entries in the CSE 42 is generated, the completion of the instructions is prevented by turning off a valid signal for all entries in the CSE 42. In this case, the entries residing in the subregister 434 also should not be subject to the determination of completion, but when the signal to release all entries mentioned above is generated, the entries the valid signal of which is on already reside in the subregister 434 as a result of operation of the first entry selection section 431 and the entry storage section 432 and these entries in the subregister 434 will be subject to the determination of completion, if any prevention means is not provided.

In order to avoid such problem, in the cycle in which the signal to release all entries in the CSE 42 is generated, the valid signal for the entries in the subregister 434 must be turned off.

By the method mentioned above, the completion conditions of the entries in the subregister 434 is prevented from being determined in the next cycle.

As is apparent from the above description, according to the present invention, by improving the circuit design of a part in which instruction completion conditions are determined in one cycle, there is provided information processing equipment that allows entries in a CSE to be released smoothly even though the number of entries in the CSE, or the clock frequency, is increased.

What is claimed is:

1. An instruction execution apparatus, in information processing equipment, comprising:
   a commit stack entry units having a plurality of entries, and
   storing, according to a clock signal cycle, instructions in order,
   executing said instructions out of order using a superscalar method, and
   then releasing entries from said commit stack entry unit in order and in response to a completion signal indicating that the executing of said instructions is completed;

a register, which is separate from the commit stack entry unit, storing only a copy of contents of each of a maximum number of entries that can be completed simultaneously in one cycle, the storing in the separate register at one cycle before a cycle for determining completion conditions of the entries in said commit stack entry unit, and an entry at a head of said maximum number of entries stored in the register storing an oldest unreleased instruction among all the entries in said commit stack entry unit;

a completion condition determination section determining whether the instructions stored in the entries of said separate register are completed in a-the cycle for determining completion conditions of the entries in said commit stack entry unit; and an entry release section releasing only the entries that are determined to be completed by said completion condition determination section among all entries in said commit stack entry unit, and updating resources of said information processing equipment when an entry is released.

2. An instruction execution apparatus according to claim 1, wherein said entry release section releases the entries in said commit stack entry unit in a cycle subsequent to the said completion condition determination cycle.

3. An instruction execution apparatus according to claim 1, further comprising a decoder for issuing said instructions in order and storing the instructions in said commit stack entry unit.

4. An instruction execution apparatus according to claim 1, wherein said entry release section also updates other resources in said instruction execution apparatus in association with the entries that are determined to be completed by said completion condition determination section.

5. An instruction execution apparatus according to claim 1, further comprising an entry selection section that is connected to said commit stack entry unit, and an entry content storage section for storing a copy of the entries selected by said entry selection section, wherein:

said entry selection section selects the entries the number of which is more than the maximum number of the entries that are executable simultaneously in one cycle with the entry storing the oldest unreleased instruction at the head among all entries in said commit stack entry unit at one cycle before the cycle for determining completion conditions of the entries in said commit stack entry unit after execution of said instruction, and said entry content storage section selects the entries for which the completion conditions are determined and stores the copy of the content of such entries from the entries that are selected by the entry selection section, from which the entries for which the completion conditions are determined, and which are settled to be released, are excluded.

6. An instruction execution apparatus according to claim 5, wherein said entry selection section determines the entry that stores the instruction having the oldest execution order based upon an output pointer value indicating the number of said entry having the oldest execution order in said completion condition determination cycle among all entries in said commit stack entry unit, and then selects the entries the number of which is more than the maximum number of entries that can be completed in one cycle with the determined entry at the head.

7. An instruction execution apparatus according to claim 6, wherein said entry content storage section further comprises a second entry selection section for selecting the entry that is subject to determination of said completion conditions based upon the number of entries that are released in said completion condition determination cycle.

8. An instruction execution apparatus according to claim 5, further comprising:

a coincidence circuit detecting whether there is a coincidence between an instruction identifier showing an entry number in said commit stack entry unit that is sent simultaneously with a completion signal that is generated upon completion of the instruction and an entry number selected by said entry selection section and outputting a flag showing the completion signal of the coincident entries, from which the entries for which the completion conditions are determined and which are settled to be completed in the present cycle are excluded; and a logical OR circuit for performing logical OR operation between the output of said entry selection section and said coincidence circuit, wherein the output of said logical OR circuit is stored in said register.

9. An instruction execution apparatus according to claim 8, wherein a flag showing the completion signal of the entry for which noncoincidence is detected by said coincidence circuit is set in the entry that corresponds to the entry number in said commit stack entry unit.

10. A method of instruction execution, comprising:

storing instructions in order according to a clock signal cycle in a commit stack entry unit;

executing the instructions out of order;

storing only a copy of contents of each of a maximum number of entries that can be completed simultaneously in a cycle in a register that is separate from the commit stack entry unit, determining whether instructions stored in the entries of the separate register are completed; and releasing entries from the commit stack entry unit only based on the determining, wherein the entries are released in order, and wherein the storing the copy of the contents stores, as an entry at a head of said maximum number of entries an oldest unreleased instruction, among all entries in said commit stack entry unit.

* * * * *

UNITED STATES PATENT AND TRADEMARK OFFICE
CERTIFICATE OF CORRECTION

PATENT NO. : 7,278,010 B2  Page 1 of 1
APPLICATION NO. : 10/331917
DATED : October 2, 2007
INVENTOR(S) : Yasunobu Akizuki et al.

It is certified that error appears in the above-identified patent and that said Letters Patent is hereby corrected as shown below:

Title Page, Column 1 (Title), Line 3, after "UNIT" insert --AND AN ENTRY RELEASE SECTION--.

Title Page, (57) Column 2 (Abstract), Line 7, after "section" delete "44".

Title Page, (57) Column 2 (Abstract), Line 10, after "section" delete "44".

Column 1, Line 3, after "UNIT" insert -- AND AN ENTRY RELEASE SECTION--.

Column 12, Line 58, change "units" to --unit,--.

Column 13, Line 14, after "in" delete "a-".

Signed and Sealed this

Twenty-ninth Day of April, 2008

JON W. DUDAS
*Director of the United States Patent and Trademark Office*